United States Patent Office 3,193,469
Patented July 6, 1965

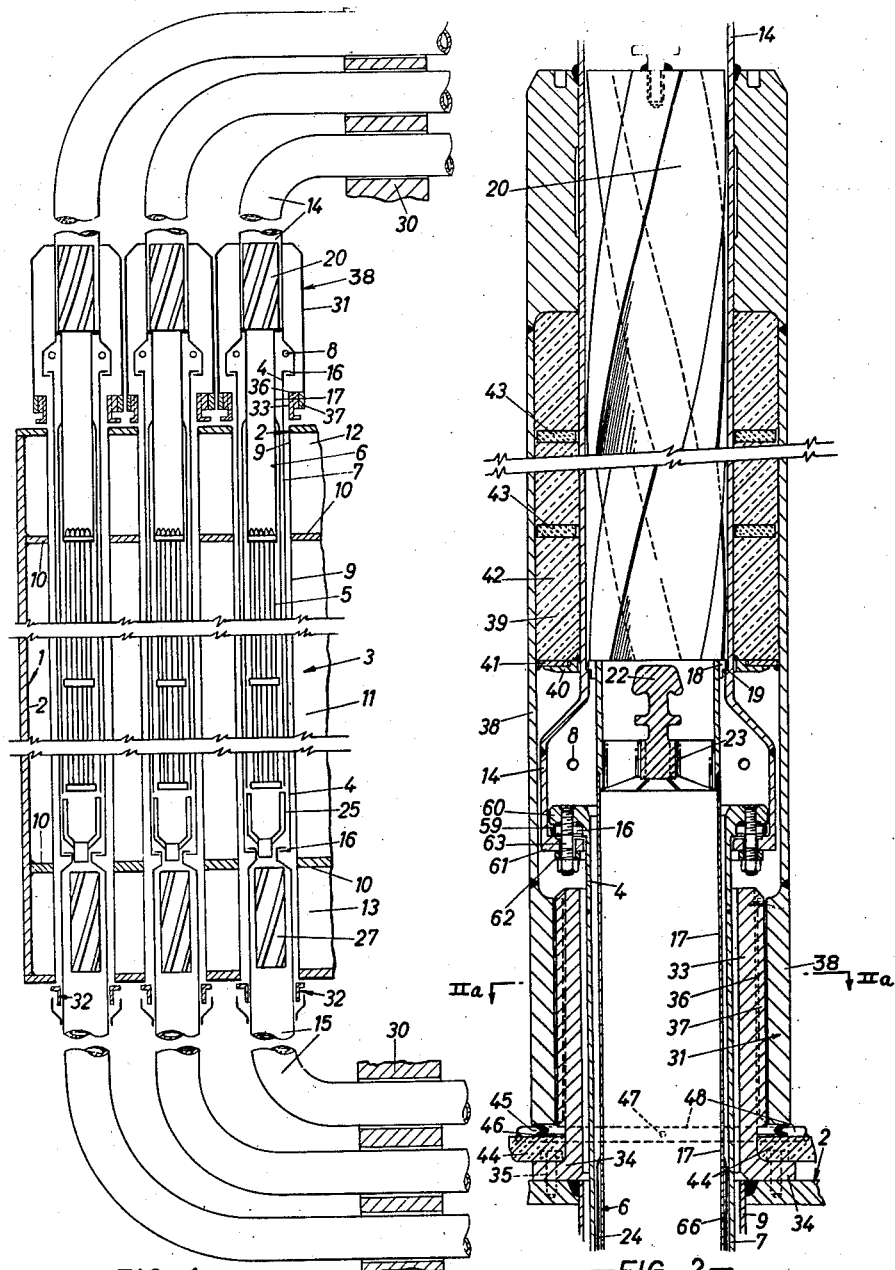

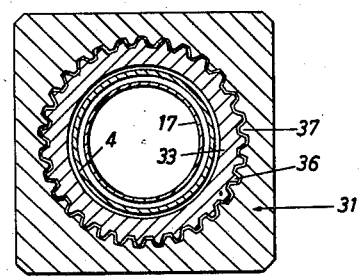
—FIG. 2A.—
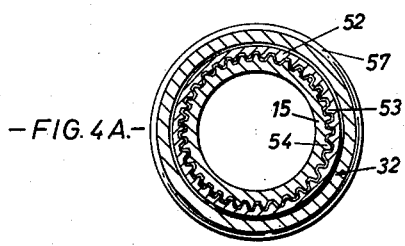
—FIG. 4A.—
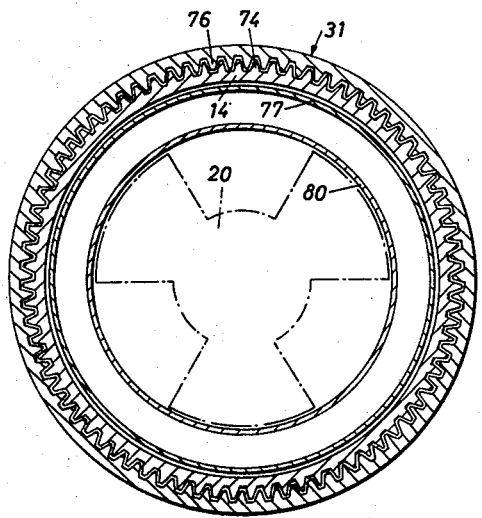
—FIG. 5A.—
INVENTORS:
NORMAN BRADLEY
DONALD WILFRED LAWSON
BY
*Larson and Taylor*
ATTORNEYS

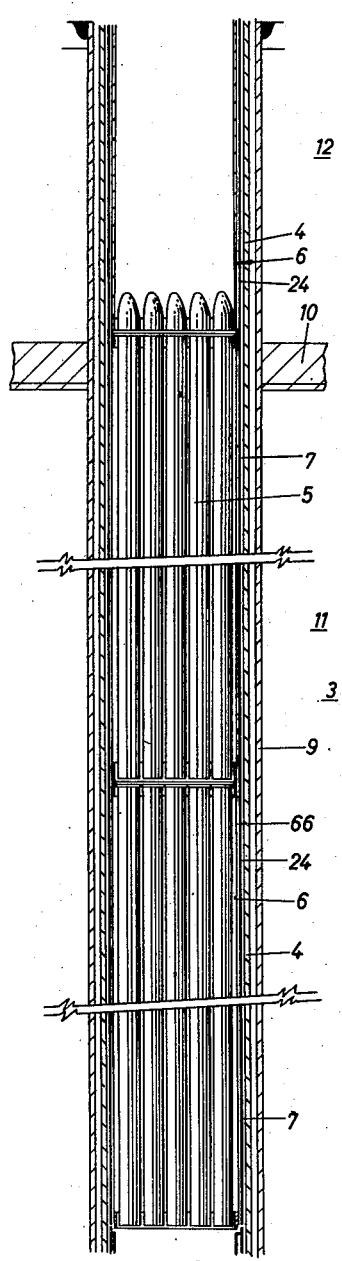
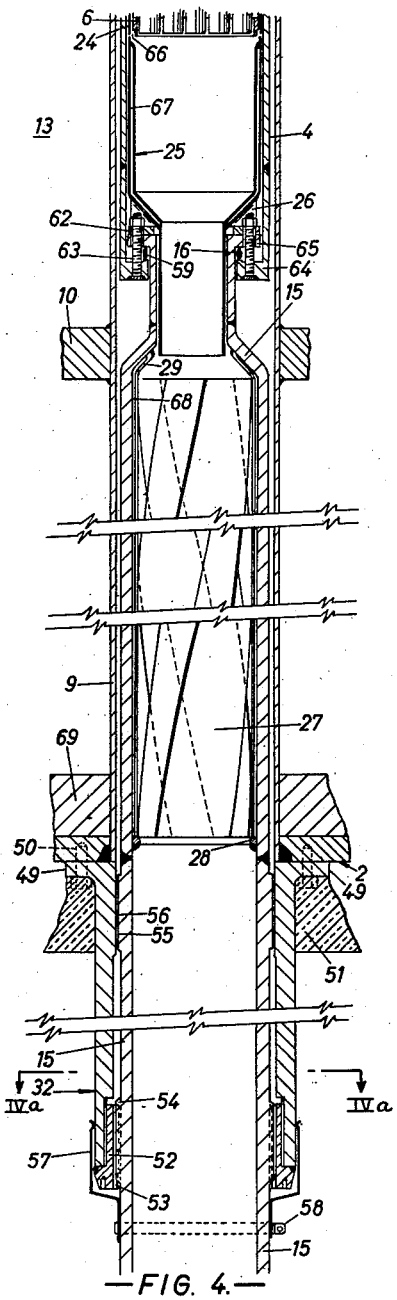
-FIG. 3.-    -FIG. 4.-

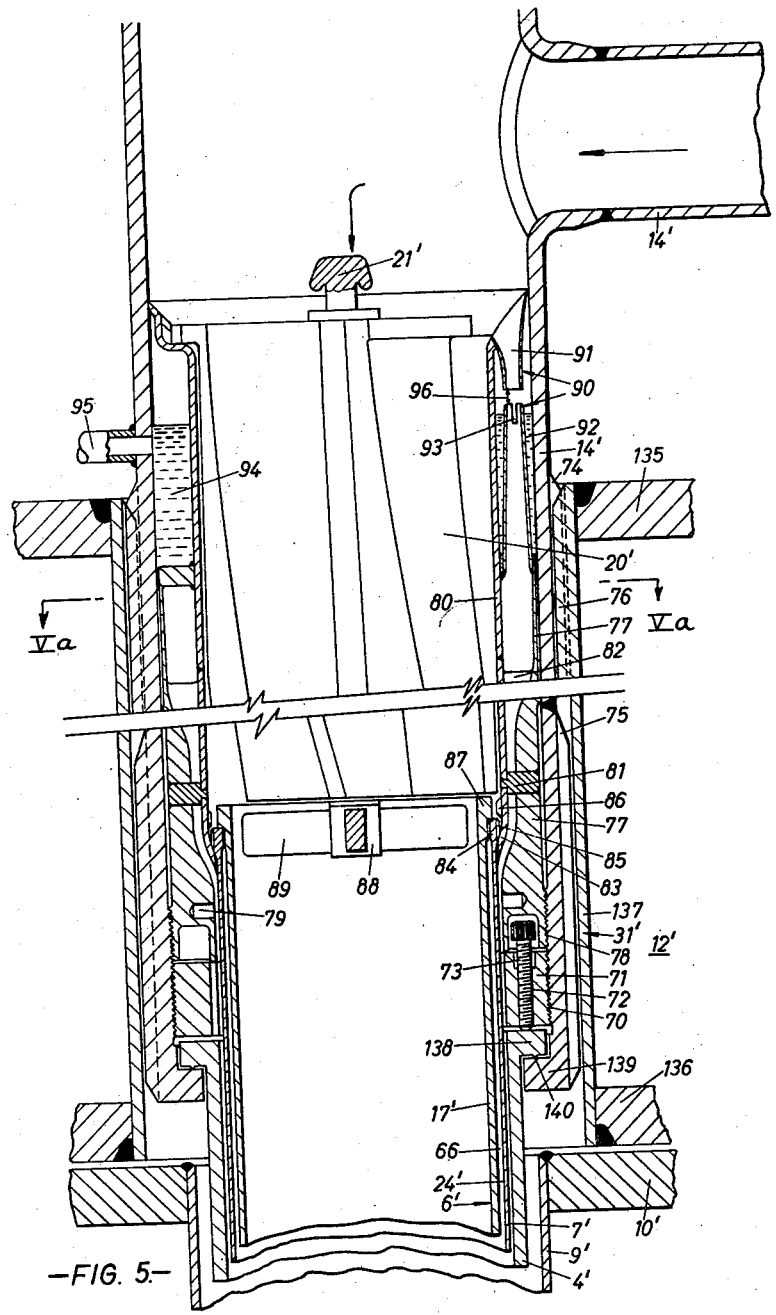

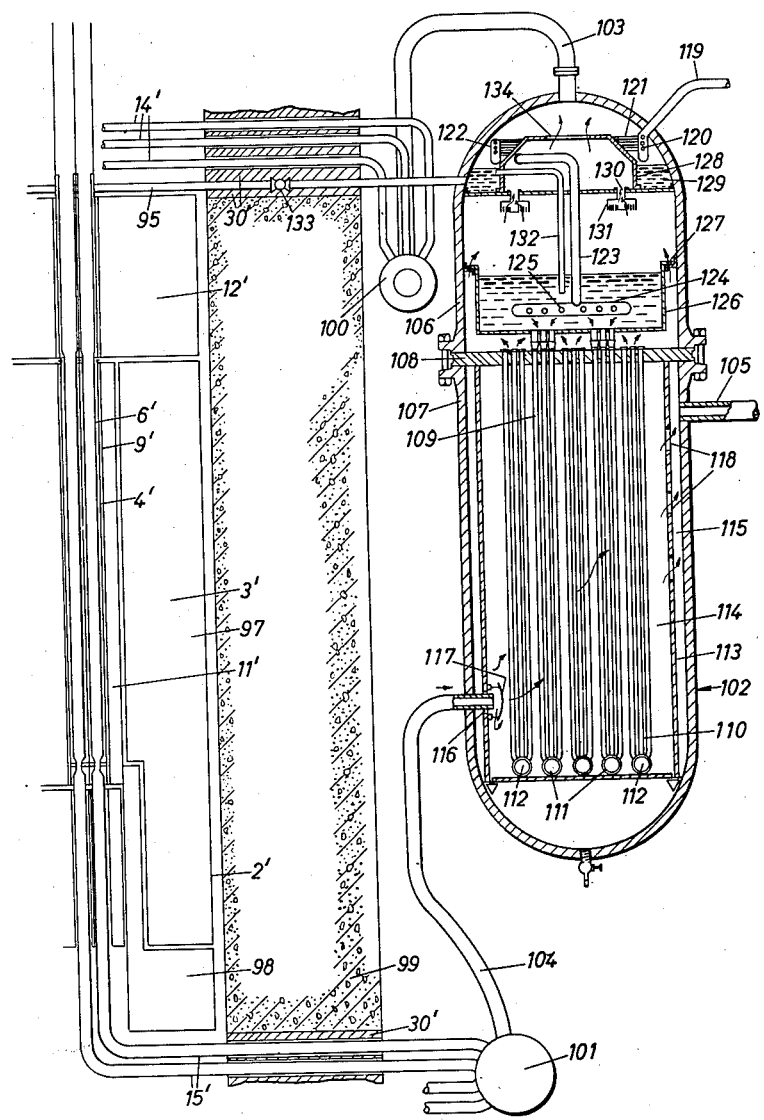
—FIG. 6.—

3,193,469
CORE STRUCTURE FOR A VAPOR COOLED, WATER MODERATED NUCLEAR REACTOR
Norman Bradley, Culcheth, near Warrington, and Donald Wilfred Lawson, Altrincham, England, assignors to United Kingdom Atomic Energy Authority, London, England
Filed Oct. 26, 1959, Ser. No. 848,722
Claims priority, application Great Britain, Oct. 14, 1959, 34,765/59
5 Claims. (Cl. 176—58)

This invention relates to nuclear reactors of the kind comprising a moderator provided with a lattice of pressure resisting tubes in which fuel elements can be located and along which a pressurised vapour coolant can be passed to remove heat from the fuel elements, said tubes having demountable joints to pipes for passing pressurised coolant through the tubes to remove heat from the fuel elements.

In reactors of the kind hereinbefore described, the general run of said pipes is in a direction usually at right angles to, and certainly inclined to the axis of the tubes with which they connect. With temperature changes taking place in the pipes during operation of the reactor (and especially at shut-down and start-up) bending and twisting moments are applied to the tubes. Such moments are undesirable as they can cause deflections to the tubes and thereby modify neutron flux distribution, temperatures and flows; they can distort the tubes and perhaps more important, they can stress the joints between the tubes and pipes, the joints being in a confined space such that there is no opportunity to design wide flanges and strong clamping devices to resist the said moments.

According to the invention a nuclear reactor of the kind comprising a moderator provided with a lattice of pressure resisting tubes having demountable joints to pipes for passing pressurised coolant through the tubes to remove heat from the fuel elements, said pipes having a general run in a direction which is inclined to or at right angles to the axes of the tubes, is characterised in that the pipes have supporting means near their joints with the tubes such that longitudinal expansion and contraction of the tubes is permitted by the said supporting means, whereas said supporting means serve to relieve the tubes and joints from stresses produced by moments exerted by thermal movement of the pipes.

An embodiment of the invention will now be described by way of example with reference to the accompanying drawings wherein:

FIGURE 1 is a fragmentary side view, in medial section, of a reactor embodying the invention. FIGURES 2, 3 and 4 are enlarged details of FIGURE 1. FIGURES 2A and 4A are sections on the lines IIa—IIa of FIGURE 2 and IVa—IVa of FIGURE 4 respectively. FIGURE 5 is a modification of the apparatus shown in FIGURE 2. FIGURE 5A is a section on the lines Va—Va of FIGURE 5, and FIGURE 6 is a part-diagrammatic arrangement.

Referring to FIGURE 1, a steam-cooled, heavy-water moderated reactor 1 includes a tank 2 for containing the moderator 3, upright pressure resisting tubes 4 locating nuclear fuel elements 5, thin barrier sleeves 6 lining the tubes 4 and spaced therefrom by narrow gaps 7, and ports 8 for injecting water into the gaps 7.

The moderator tank 2 is pierced by a series of calandria tubes 9 which locate the channels 4 and is divided into three horizontal sections by division plates 10, namely a centre section 11 containing the moderator 3 and upper and lower sections 12 and 13 respectively which contain light water for neutron shielding.

The tubes 4 are connected to coolant inlet and outlet pipes 14 and 15 respectively by demountable joints 16. The tubes 4 are of zirconium and the pipes 14, 15 of steel.

Referring now to FIGURES 2, 3 and 4, the sleeves 6 enclose and support the fuel elements 5, the upper ends of the sleeves 6 having extensions 17 with radial lugs 18 (FIGURE 2) which are supported by landings 19 formed in the lower ends of the inlet pipes 14. The upper ends of the sleeve extensions 17 provide support for neutron scatter plugs 20 which, whilst allowing a tortuous but unrestricted free flow to coolant, prevent the passage of neutrons with the coolant by scattering and absorption. A full description of a neutron scatter plug is disclosed in copending application Serial No. 834,190 by E. Long and W. Rodwell, filed August 17, 1959, now Patent No. 3,132,998. The scatter plugs 20 may be raised and lowered by means of studs 21 attached thereto. Similar studs 22 attached to spiders 23 carried in the upper ends of sleeve extensions 17 allow raising and lowering of the sleeves 6 and thus the fuel elements 5.

The outer wall of the sleeve extensions 17 carry coaxial sleeves 24 which extend to the lower ends of the sleeves 6. The upper ends of the sleeves 24, where attached to the sleeve extension 17, are closed, the lower ends being open, spaces 66 between the sleeves 24 and sleeve extensions 17 and between sleeves 24 and 6 being static, that is, not circulated by coolant, in order to reduce heat transfer between the fuel elements 5 and the zirconium tubes 4. Thus the tubes 4 are, in the main subjected to heat by irradiation only, such as gamma-heating which is produced in a material when energy is given up by absorption of gamma-rays. Further static spaces 67 are provided within the double walls of sleeve members 25 disposed below the lower ends of the sleeves 6 and 24. The sleeve members 25 are supported within the lower ends of the tubes 4 by brackets 26 carried by the upper ends of coolant outlet pipes 15.

The coolant outlet pipes 15 carry neutron scatter plugs 27 upon support rings 28 welded internally to the pipes 15. Sleeves 29 co-axial with the pipes 15 and with their ends welded thereto provide static spaces 68 between the plugs 27 and pipes 15.

Away from the tubes 4, the coolant pipes 14, 15 have a general run in a direction inclined at right angles to the axes of the tubes 4 and are constrained to move in this direction by restraint members 30 (FIGURE 1). With temperature changes taking place in the pipes 14, 15 during operation of the reactor, bending and twisting movements will tend to be applied to the tubes 4 and their joints 16, such twisting tendencies being attributable to any departure of the run of the pipes from the plane through the respective tube axes. To prevent this, the pipes 14, 15 are secured near their respective joints 16 by upper and lower guide members 31, 32 respectively, the guide members 31, 32 functioning as supporting means and allowing lengthwise movement of the tubes 4 and pipes 14, 15 but resisting the application of bending and twistings moments to the tubes 4 and joints 16.

The upper guide members 31 (FIGURE 2) include fixed sleeve parts 33 embracing with clearance the upper ends of the channels 4. Flanges 34 of the sleeve parts 33 are rigidly secured by bolts 35 to the top of the moderator tank 2. The fixed sleeve parts 33 have external straight splines 36 for interlocking sliding engagement with complementary internal splines 37 of movable sleeve parts 38 of square outline. The splines 36, 37 prevent twist of the (axially) movable sleeve parts 38 about the fixed sleeve parts 33 to a degree limited by clearance required to accommodate sliding engagement of splines 36, 37. The upper ends of the movable sleeve parts 38 embrace the coolant inlet pipes 14 and are welded thereto. The movable sleeve parts 38 have internal recesses 39 closed by plates 40, 41 welded to pipes 14 and sleeve parts 38 respectively, the recesses 39 being filled with a mixture of graphite granules 42 and boron-steel plates 43. The close-packed sleeve parts 38 (FIGURE 1) combine to form a neutron shield above the moderator tank 2. The lower ends of the movable sleeve parts 38 (FIGURE 2) are sealed to the upper face of a heat-insulating slab 44 covering the top of the moderator tank 2, by bellows 45 mounted on seal-plates 46. The bellows 45 has apertures 47 connected to a common take-off pipe 48 leading to a detecting device so that out-leakage of reactor coolant from the joints 16 may be readily detected.

The lower guide members 32 (FIGURE 4) have upper flanged ends 49 rigidly secured to the bottom of the moderator tank 2 by bolts 50, the tank 2 being reinforced by a steel shielding plate 69. A heat-insulating slab 51 covers the bottom of the tank 2. Bush parts 52 screwed into the lower ends of the guide members 32 have internal splines 53 for sliding engagement with external splines 54 on the coolant outlet pipes 15. The pipes 15 also have raised surfaces 55 for sliding engagement with similar surfaces 56 on the guide members 32. Muffs 57 held to the pipes 15 by clamps 58 seal the guide members 32 to the pipes 15. The splines 53 on the bush part 52 are pitched slightly eccentric relative to the axis of the pipes 15 so as to enable correction of any slight misalignment of the tubes 4 when fitted within the calandria tubes 9. The bush parts 52 are adjusted accordingly before the guide members 32 are secured to the bottom of the moderator tank 2, and are then welded to the guide members 32.

The joints 16 between the zirconium tubes 4 and the respective ends of the steel pipes 14, 15 provide for the differing coefficients of expansion of the two materials. Referring to FIGURE 2, a gasket 59 between flanged ends 60, 61 of a tube 4 and pipe 14 respectively is formed of sintered material, the composition of the material varying from one contact edge to the other in such a manner that the coefficients of expansion of zirconium and steel are matched sufficiently to eliminate differential expansion in a radial direction. A stainless steel backing ring 62 and high tensile steel clamping studs 63 match the expansion coefficients of steel and zirconium sufficiently to eliminate differential expansion in an axial direction. FIGURE 4 shows a similar joint 16 between flanged ends 64, 65 of a tube 4 and pipe 15 respectively.

When in operation, the reactor is cooled by a flow of steam coolant which enters the inlet pipes 14 in a saturated condition, the steam flow dividing out below each scatter plug 20 into a major coolant fraction passing down through the respective sleeve extension 17 and into the respective sleeve 6 containing the fuel elements 5 and a minor fraction passing into the gap 7 external the sleeve extension 17 to mix with water injected through the ports 8 in the lower end of the pipe 14. The mixture of steam and water passes on down through the gaps 7 absorbing heat from the walls of the tubes 4 as it does so. This heat is the result of the absorption of gamma-radiation by the tubes 4 and when given up results in the evaporation of the water contained in the mixture. Beneath the lower ends of the sleeves 24 the minor coolant fraction now wholly steam once more, but with slight superheat, rejoins the main fraction which has received superheat in passage over the fuel elements 5 and the combined flow then passes into the outlet pipes 15.

FIGS. 5 and 6 show various modifications incorporating a joint 16, an upper guide member 31, and a method of injecting water into gaps 7' between the pressure tubes 4' and guide sleeves 6'. Referring to FIGURE 5, in the arrangements shown, light water shielding section 12' above a tank 2' with heavy water moderator 3' is contained in a separate shield tank having upper and lower tank plates 135 and 136 respectively, inter-connected by spacer-tubes 137. The tank 2' has calandria tubes 9'. Zirconium presure tubes 4' and steel coolant pipes 14' have flanged ends 138, 139 respectively, the mating faces of the ends 138 of the tubes 4' each having an integral ring 140 of substantially triangular cross section. The lower end of the pipes 14' have internal screw-threaded portions 70 for engagement with screw threaded rings 71. The rings 71 each have a series of screw-threaded holes 72 (one of which is shown in FIGURE 5) for bolts 73 whose lower ends bear upon the back face of the flanged end 138 of the zirconium tube 4'. With the rings 71 in the position shown, tightening of the bolts 73 results in the flanged ends 138 being rigidly clamped against the flanged ends 139 of the pipes 14'. When the joints 16' become heated, for example during operation of the reactor, the rings 140 yield plastically to allow differential expansion of the tubes 4' and pipes 14' whilst maintaining a leak-tight joint. Away from the tubes 4', the coolant pipes 14', 15' have a general run in a direction inclined to the axes of the tubes 4' and are constrained to move in this direction by restraint members 30'.

The guide members 31' comprise upper and lower splines 74, 75 respectively on the external surfaces of the pipes 14' together with the shield tank spacer tube 137 and complementary internal splines 76 thereon. The upper splines 74 on the pipes 14' have interlocking sliding engagement with the splines 76 on the spacer tubes 137 to prevent the application of twisting moments to tthe tubes 4' and joints 16' to a degree limited by clearance required to accommodate sliding engagement of the splines 74, 76. The lower splines 75 on the pipes 14 have slight clearance with the inner walls of the spacer tubes 137, preventing substantial side movement of the pipes 14' and thus the application of bending moments to the tubes 4' and joints 16'.

Fuel element extension sleeves 17' and coaxial sleeves 24' spaced therefrom by static spaces 66' are supported from sleeve members 77 carried in the lower ends of the pipes 14', the sleeve members 77 having screw-threaded end portions 78 for engagement with internal screw-threaded portions 70 on the lower ends of the pipes 14'. The sleeve members 77 each have holes 79 which serve as sockets for projections carried on a suitable tool so that they may be rotated to in order to be screwed down hard upon the upper faces of the rings 71.

Co-axial with the sleeve members 77 are sleeves 80 which are attached thereto by support studs 81 and stiffening ribs 82. The sleeves 80 have inwardly tapering lower ends 83 which provide support for enlarged ends 84 of the sleeves 24'. The ends 84 of the sleeves 24 have external splines 85. External splines 86 of the same pitch as the splines 85 are provided on the lower ends of the sleeve 80. The splines 85, 86 are of large pitch so that when a sleeve 24' is lowered into its illustrated position and rotated slightly, the relative positions of the splines 85, 86 then prevent direct withdrawal of the sleeve 24'. The upper faces of the enlarged ends 84 of the sleeves 24' support rings 87 integral with the upper ends of the sleeve extensions 17', the rings 87 supporting in turn neutron scatter plugs 20' having lifting studs 21'. Spiders 88 with legs 89 extending to the inner walls of the sleeve extensions 17' provide for lifting and lowering of the latter and hence fuel elements (not shown) attached thereto.

The sleeve members 77 each carry three equi-spaced water injectors 90 of venturi form, the outlets of which discharge into gaps 7' between tubes 4' and sleeves 6'. Each of the injectors 90 comprises a nozzle 91 and pick-up duct 92, the latter having a longitudinal slot 93, at its upper end. A space 94 defined by the sleeve 80 and the pipe 14' is filled with water supplied through a duct 95. Steam coolant entering the pipe 14' divides into major and minor fractions, the minor fraction passing through the water injectors 90 to entrain water spilling through the slots 93, the mixture of steam and water passing on into the gap 7'. It will be noted that the nozzles 91 and pick-up ducts 92 are separated by a gap 96. This is to allow an overflow of water into the pick-up ducts 92 to become entrained with the steam emerging from the nozzles 91 should the slots 93 in the pick-up ducts 92 become blocked.

FIGURE 6 shows a part-diagrammatic arrangement for supplying water to the ducts 95 described above, and shows the reactor 1 shown in FIGURE 1 modified according to the embodiment shown in FIGURE 5 with the further addition of a side tank 97 for light water shielding, a moderator dump tank 98 and concrete biological shielding 99. Pipes 14' and 15' are shown connected to common headers 100 and 101 respectively, which headers are connected in turn to an evaporator 102.

The reactor of FIGURE 6 utilizes the multi-pass coolant system described in copending applications Serial No. 848,720 by N. Bradley, filed October 26, 1959, now Patent No. 3,091,582, the evaporator 102, pipes 14', 15' and tubes 4' shown in FIGURE 5 being part of the first pass of the system described therein. In operation, saturated steam generated in the evaporator 102 flows through a pipe 103 to the header 100 whence it enters the pipes 14' to flow along the tubes 4' comprising the first pass to receive superheat, the superheated steam then flowing into the header 101 by way of the pipes 15' and thence to the evaporator 102 through a pipe 104. Superheat is then given up in passage through the evaporator 102, the steam leaving the evaporator by way of a pipe 105 leading to a header (not shown) connected to a further series of pipes similar to the pipes 14', tubes similar to tubes 4' and pipes similar to the pipes 15' comprising the second pass of the reactor.

The evaporator 102 comprises upper and lower shells 106 and 107 respectively, divided by a tube plate 108. The tube plate 108 is perforated by a series of down-comer tubes 109 and up-riser tubes 110, the tubes 109, 110 having inter-connected headers 111 and 112 respectively. The tubes 109, 110 are enclosed within a tubular baffle 113, the baffle 113 defining inner and outer spaces 114 and 115 respectively. The lower shell 107 of the evaporator is perforated to accommodate the pipe 104, the end of the pipe extending through an aperture 116 in the baffle 113. A plate 117 shields the end of the pipe 104 to prevent steam impingement on the tubes 109, 110. Steam flows from the pipe 104, over the tubes 109, 110 in the space 114 to enter the space 115 through apertures 118 in the baffle 113 and to leave the evaporator by way of the pipe 105.

Feed water first enters the evaporator 102 through a pipe 119 perforating the upper shell 106, the pipe 119 terminating in a header 120 from which extends a series of coils 121 connected to a header 122 diametrically opposite the header 120. A header outlet 123 connects the lower end of the header 122 with a coiled pipe 124 perforated by holes 125. The coiled pipe 124 is disposed within a feed water header tank 126 attached to the walls of the upper shell 106 by spaced brackets 127. The header tank 126 supplies the down-comer tubes 109 with feed water, the upper ends of the tubes 109 perforating the bottom of the header tank 126, being secured thereto in a sealing manner.

Above the header tank 126, a number of steel plates form an enclosure 128, the sidewalls of which define a space 129 with the upper inner walls of the upper shell 106. The side walls of the enclosure 128 are perforated to accommodate the feed outlet pipe 123 leading from the header 122 to the coiled pipe 124 in the header tank 126. The outlets 130 of a pair of steam driers 131 discharge into the enclosure 128 which communicates with the interior of the shell 106 by way of an aperture 134. Saturated steam generated in the upriser tubes 110 flows upwardly and around the header tank 126, through the steam driers 131, into the enclosure 128 and through the aperture 134 therein to leave the evaporator 102 by way of the pipe 103. Steam collecting in the upper part of the shell 106 condenses on the relatively cold feed water coils 121, the condensate collecting in the space 129 whence it flows to the reactor coolant pipes 14' by way of the horizontally disposed inter-connecting duct 95. The level of condensate in the space 129 is limited by an overflow 132 which spills into the header tank 126.

Condensate flows along the duct 95 under a slight static head having a maximum value corresponding to the vertical distance between the overflow 132 and the duct 95, and is assisted by the steam pressure drop between the pipe 103 and the pipes 14'. Flow control may be effected by a valve 133, but under normal conditions the rate of flow varies automatically with the reactor load. This is because the pressure drop of steam between the pipe 103 and the evaporator 102 and the reactor pipes 14' varies as the square of the reactor load represented by the heat output. As the pressure drop of the condensate along the duct 95 varies in accordance with steam pressure drop between the pipe 103 and pipes 14', the rate of condensate flow along the duct 95 varies according to the reactor load. Thus the amount of water injected into the gaps 7' between the tubes 4' and guide sleeves 6' varies according to the intensity of head and thus of radiation emitted by the reactors.

We claim:

1. In a nuclear reactor, the combination comprising: a tank structure; pressure resisting tubes arranged in a lattice in the tank structure and having means for housing nuclear fuel elements therein; at least one pipe extending to each of said tubes for passing a pressurized coolant therethrough, each pipe having a general run inclined to the axis of the respective tube; joint means interconnecting each said pipe with its respective tube; and support means associated with each pipe and disposed in a region proximate to the respective joint means to join the respective pipe to the tank structure, said support means including a pair of interlocking twist preventing members having means preventing relative twisting while permitting longitudinal expansion and contraction of the respective tube and preventing displacement of the pipe laterally of the tube, and the support means comprising means to relieve the tube and joint from stresses otherwise produced by movements arising from the thermal movements of the pipes.

2. In a nuclear reactor, the combination comprising: a tank structure; pressure resisting tubes arranged in a lattice in the tank structure and having means for housing nuclear fuel elements, at least one pipe extending to each of said tubes for passing a pressurized coolant therethrough and each having a general run inclined to the axis of its respective tube; joint means interconnecting said pipes respective with said tubes, a pair of interlocking members disposed in a region proximate to the respective joint means and associated with each of said pipes, one of the members being a part of the respective pipe and the other member being fixed to the tank structure, the pair of members having mutually interengaging means permitting sliding movements in the axial direction of the respective tube while preventing relative twisting, the pair of interlocking members permitting expanding and contracting movements of the respective pipes and tubes and relieving the pipes and tubes of stresses produced by said movements.

3. The combination as set forth in claim 2 wherein one of said members comprises a plurality of straight splines formed on the respective pipe, and the other of said members comprises a plurality of complementary splines interlocking therewith.

4. The combination in a nuclear reactor is set forth in claim 2 wherein said one of said pair of members is a sleeve, part of which is fixedly attached adjacent one end thereof to the exterior of the respective pipe and adjacent the other end thereof is formed with straight splines, said splines mating with complementary splines formed on said other of said pair of members.

5. In a nuclear reactor having a moderator-containing structure, the combination comprising: pressure resisting tubes arranged in a lattice in the structure and having means for housing nuclear fuel elements; respective pipes extending to said tubes for passing pressurized coolant therethrough, each pipe having a general run inclined to the axes of its respective tube; rigid joint means interconnecting said pipes with respective tubes; support means associating each of said pipes with said structure and disposed in a region proximate to the respective joint means, the support means comprising a sleeve part in co-axial alignment with the respective tube and embracing the respective pipe with clearance by fixed attachment thereto and adjacent one end of said sleeve part, straight splines formed adjacent the other end of said sleeve part; a member in fixed relationship with said moderator-containing structure having complementary splines mating with the splines on said sleeve part to permit relative sliding movement in the axial direction of the respective tube while preventing relative twisting movement; and a neutron shielding medium packed within said clearance between said sleeve part and the respective pipe.

References Cited by the Examiner

UNITED STATES PATENTS

| | | | |
|---|---|---|---|
| 2,725,993 | 12/55 | Smith et al. | 214—23 |
| 2,831,807 | 4/58 | McGarry | 176—43 |
| 2,856,339 | 10/58 | Wigner et al. | 176—30 |
| 2,899,218 | 8/59 | Creighton | 285—330 X |
| 2,936,273 | 5/60 | Untermyer | 60—108 |
| 2,977,297 | 3/61 | Evans et al. | 176—81 |
| 2,984,609 | 5/61 | Dickson et al. | 176—29 |
| 3,039,947 | 6/62 | Fortescue et al. | 176—71 |

CARL D. QUARFORTH, *Primary Examiner.*

ROGER L. CAMPBELL, *Examiner.*